United States Patent
Nagy

(10) Patent No.: US 7,300,168 B2
(45) Date of Patent: Nov. 27, 2007

(54) SYSTEM FOR CREATING SPECTRAL DISPLAYS

(76) Inventor: James F. Nagy, 21579 State Route 93 S., Logan, OH (US)

( * ) Notice: Subject to any disclaimer, the term of this patent is extended or adjusted under 35 U.S.C. 154(b) by 0 days.

(21) Appl. No.: 10/825,903

(22) Filed: Apr. 16, 2004

(65) Prior Publication Data
US 2004/0240089 A1    Dec. 2, 2004

Related U.S. Application Data

(60) Provisional application No. 60/463,526, filed on Apr. 17, 2003.

(51) Int. Cl.
*G02B 5/04*    (2006.01)
(52) U.S. Cl. .................. 359/615; 359/625; 359/833; 353/3
(58) Field of Classification Search ............ 359/615, 359/625, 627, 832, 833, 837, 851, 855; 353/3
See application file for complete search history.

(56) References Cited

U.S. PATENT DOCUMENTS

| | | | | |
|---|---|---|---|---|
| 1,007,346 A | * | 10/1911 | Fery | 356/302 |
| 2,594,334 A | * | 4/1952 | Miller | 356/331 |
| 2,669,899 A | * | 2/1954 | Macleish | 356/332 |
| 2,855,819 A | * | 10/1958 | Luboshez | 359/669 |
| 2,874,608 A | * | 2/1959 | Beloian | 356/332 |
| 2,983,183 A | * | 5/1961 | Pickering | 355/33 |
| RE26,617 E | * | 6/1969 | Staunton | 359/350 |
| 3,489,486 A | * | 1/1970 | Cierva | 359/832 |
| 3,515,464 A | * | 6/1970 | Peifer et al. | 359/833 |
| 3,659,927 A | * | 5/1972 | Moultrie | 359/726 |
| 3,855,547 A | * | 12/1974 | Kirk | 372/100 |
| 3,880,499 A | * | 4/1975 | Miller | 359/833 |
| 4,953,956 A | | 9/1990 | Carpenter | |
| 4,955,975 A | | 9/1990 | Mori | |
| 5,146,364 A | | 9/1992 | Oku | |
| 5,247,491 A | | 9/1993 | Kwiatkowski | |
| 5,579,163 A | | 11/1996 | Peterson | |
| 5,781,290 A | * | 7/1998 | Bittner et al. | 356/326 |

* cited by examiner

*Primary Examiner*—Ricky D. Shafer
(74) *Attorney, Agent, or Firm*—McNees Wallace & Nurick LLC

(57) ABSTRACT

A highly adaptable system for creating colorful spectral displays or for achieving a prismatic effect using visible light. The invention includes a fixed-angle or monolithic prismatic element fabricated from plate glass mirror material. A compound version of this monolithic element wherein multiple single elements have been affixed to one another for the purpose of creating a more complex spectral display is also provided. The invention also includes a prism-like device that utilizes a standard mirror, mirrors, or other materials with highly reflective surfaces and water or a similar fluid that disperses light in a predictable manner at or on a specific target. Both the fixed prismatic elements and the adjustable light dispersing elements may be arranged into one or more arrays that may be used to create complex spectral displays on a variety of surfaces while utilizing one or more available light sources or a moving light source such as the sun.

6 Claims, 9 Drawing Sheets

SYSTEM FOR CREATING SPECTRAL DISPLAYS

CROSS-REFERENCE TO RELATED APPLICATIONS

This patent application claims the benefit of U.S. Provisional Patent Application Ser. No. 60/463,526 filed on Apr. 17, 2003 and entitled "Device and Method for Creating Spectral Displays," the disclosure of which is incorporated by reference as if fully rewritten herein.

STATEMENT REGARDING FEDERALLY FUNDED RESEARCH

This invention was not made by an agency of the United States Government nor under contract with an agency of the United States Government.

TECHNICAL FIELD OF THE INVENTION

The present invention relates generally to a system for producing spectral displays of visible light, and more specifically to prism-like devices and methods associated with such devices for creating artificial rainbows for decorative purposes and for scientific or technical applications.

BACKGROUND OF THE INVENTION

A prism is a device that may be used to disperse white light into the visible spectrum of colors. The visible spectrum of colors is commonly referred to as a "rainbow" due to the prismatic effect of rain droplets on rays of sunlight that pass through such droplets. Equilateral prisms are typically used for the dispersion of light into its component colors. Light incident at an oblique angle to the first face is dispersed according to its wavelength and emerges as a visible spectrum from the opposite face of the prism.

In addition to the potential for use in creating a pleasing display of colors, prisms are also very useful as components in certain optical systems. For example, prisms may be used to redirect or deviate an optical beam or rays or to erect an inverted image. Prisms that are commonly used in optical systems or as optical devices include right angle prisms, dove prisms, penta prisms, retro-reflectors, and precision wedge prisms.

Prisms are typically made from solid pieces of optical material such as glass or quartz. The faces of the prism are normally flat with the non-optical surfaces being left in the ground condition. The optically active faces are further ground and polished to a pre-specified degree of flatness. Prisms are usually more difficult to fabricate than mirrors or windows because several surfaces must be held in precise geometrical relationships to one another. Some prisms, such as retro-reflectors, rely greatly on the precision of these geometrical relationships. Thus, carefully controlling prism angles makes it possible to perform interesting and useful manipulations on the imaging light entering the prism.

Because light dispersing prisms are precision crafted instruments, in many cases they tend to be fragile, expensive, and not widely or immediately available for use in or as consumer products. Additionally, large spectrum forming prisms can be unwieldy, and the emergent spectral beam is only somewhat directable and must be accomplished by rotating the entire prism. Furthermore, rigid design compromises are often required to effectively control light dispersion while reducing reflection losses.

Thus, because prisms can be used as devices for teaching scientific principles to children or adults, for creating pleasing decorative spectral displays, and for a variety of technical purposes, there is a need for a less expensive prismatic device that performs the same or similar functions as the currently available glass or quartz prisms.

SUMMARY OF THE INVENTION

These and other deficiencies of the prior art are overcome by the present invention, the exemplary embodiments of which provide a relatively inexpensive and highly adaptable system for creating colorful spectral displays that, in some cases, resemble naturally occurring rainbows.

The first general embodiment of this invention provides a system for creating a spectral display or displays. This system includes at least one source of light within the visible spectrum and at least one prismatic element. The prismatic element further includes a substantially solid light dispersing medium, such as glass or quartz, a reflective or highly reflective surface attached to the light dispersing medium, and a window formed in the light dispersing medium at a predetermined angle relative to the reflective surface. In this embodiment, the angle of the reflective surface relative to the window is fixed. This fixed-angle or monolithic prismatic element is typically fabricated from plate glass mirror material. An alternate embodiment of this prismatic element includes a compound version of the element wherein multiple single elements have been affixed together, while keeping the reflective surfaces parallel to one another, to create a more complex spectral display. Advantageously, the monolithic prismatic elements of the present invention are approximately one-half of the weight of more traditional glass or quartz dispersing prisms and a far less expensive to fabricate.

The second general embodiment of this invention provides a system for creating a spectral display or displays and also includes at least one source of light within the visible spectrum and at least one prismatic element. In this embodiment, the prismatic element further includes a fluid light dispersing medium such as water, and a highly reflective surface placed within the light dispersing medium. In the exemplary embodiment, the angle of the reflective surface is adjustable relative to the source of light. Thus, this version functions in a manner similar to a prism, but utilizes a standard mirror, mirrors, or other materials with highly reflective surfaces and water or a similar fluid that disperses visible light in a predictable manner at or on a specific target.

Both the fixed prismatic elements and the adjustable light dispersing elements may be arranged into one or more arrays that may be used to create complex spectral displays while utilizing one or more available light sources or a moving light source such as the sun as it moves across the morning and/or afternoon sky. Further advantages of the present invention will become apparent to those of ordinary skill in the art upon reading and understanding the following detailed description of the preferred embodiments.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the preferred embodiments given below, serve to explain the principles of the invention.

FIG. 2b is a side view of a plurality of strips of plate glass mirror laminated to one another in an offset manner for the purpose of fabricating the compound prismatic element of FIG. 2a.

DETAILED DESCRIPTION OF THE INVENTION

In the broadest and most generic sense, the present invention provides a system for creating colorful spectral displays that, in some cases, resemble naturally occurring rainbows. The first general embodiment of this invention includes a prism-like device or prismatic element fabricated from plate glass mirror material. An alternate embodiment includes a compound version of this prismatic element. The second general embodiment includes a device that functions like a prism, but that utilizes a standard mirror, mirrors, or other materials with highly reflective surfaces and water or a similar fluid that disperses light in a predictable manner at or on a specific target. Both the prismatic elements and the light dispersing mirrors may be arranged into one or more arrays that may be used to create complex spectral displays while utilizing one or more available light sources or a moving light source such as the sun as it moves across the morning and/or afternoon sky.

A. Monolithic Prismatic Element
  1. Single Element

Figure 1A:
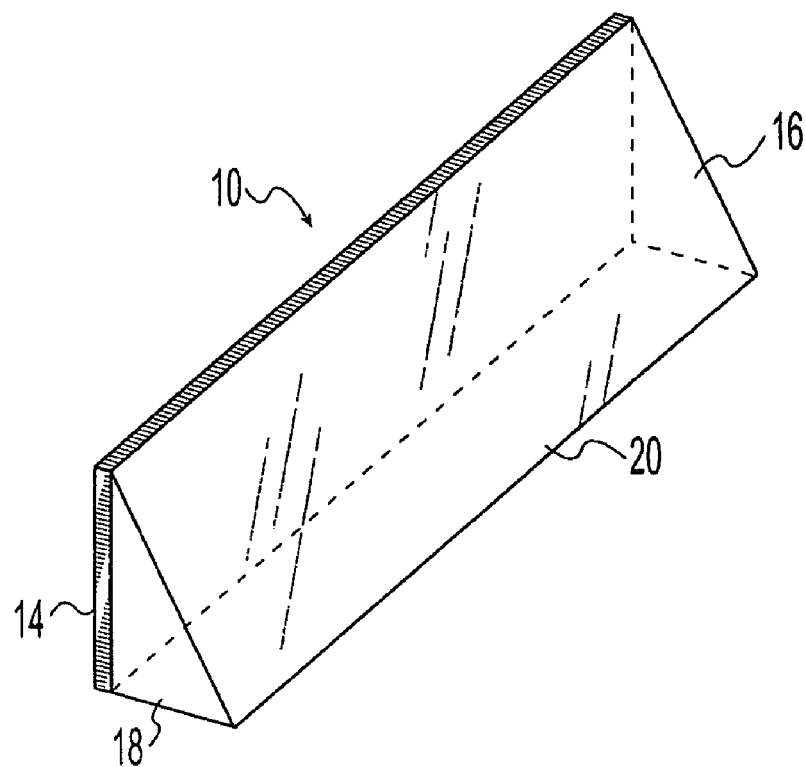
FIG. 1a is a perspective view of the individual solid prismatic element.
Figure 1B:
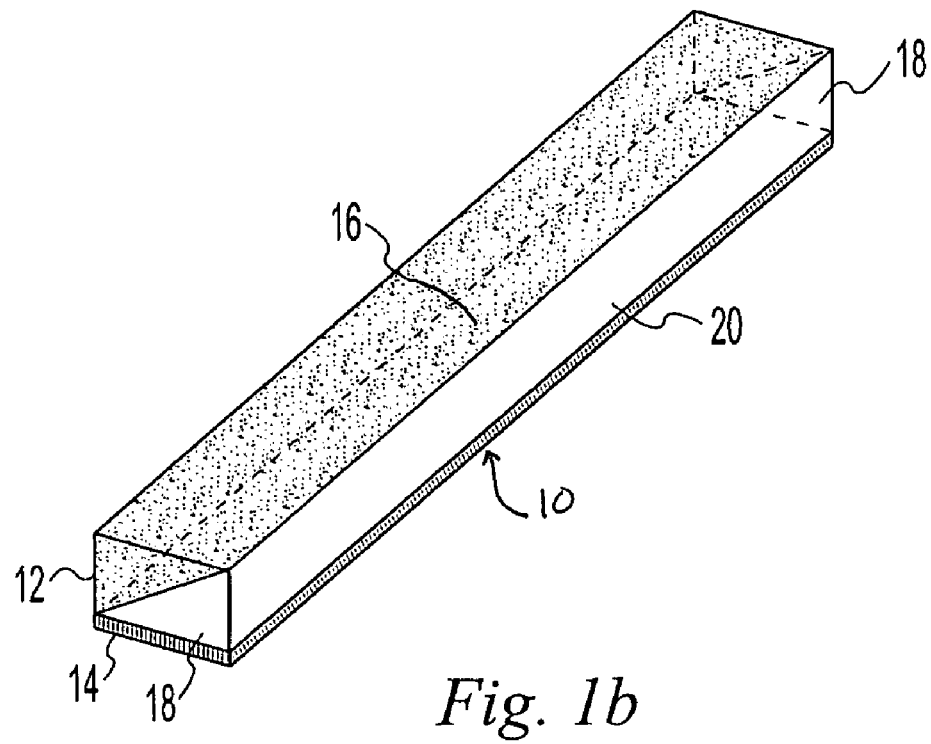
FIG. 1b is a perspective view of the prismatic element of FIG. 1a before the excess glass has been removed from the roughed-out element.

With reference now to the Figures, FIG. 1a provides a perspective view of the individual solid or monolithic prismatic element. FIG. 1b provides a perspective view of the prismatic element of FIG. 1a before the excess glass has been removed from the roughed-out element. Prismatic element 10 may be used alone, or in combination with other such elements for dispersing light and creating spectral displays under proper conditions.

In a first exemplary embodiment, prismatic element 10 comprises a piece of plate glass mirror 12, having ground surfaces 18 and 20, that has been modified to function as a light-dispersing element having prismatic properties. In contrast to the second general embodiment of light dispersing element disclosed herein, i.e., the adjustable dispersing mirror, the mirrored surface of prismatic element 10 is fixed. In general, once the element has been created from plate glass mirror, the position of the reflective surface 14 relative to the angle (about 30°) of the face of window 16 cannot typically be altered. However, the angle of the face of the window can be altered relative to the mirrored surface by additional grinding and polishing of window 16.

The monolithic prismatic element of this invention is made by utilizing techniques and devices that are well known to those skilled in the arts of glass working and optics. Typically, commercially available plate glass mirror having a thickness of 0.25 inch (0.64 cm) is preferred for the monolithic prismatic element because it (i) is widely available; (ii) is relatively inexpensive; and (iii) possesses certain desirable physical characteristics such as a high degree of flatness and strength. However, plate glass or optical glass of greater or lesser thickness may also be utilized provided that the strength and flatness of the plate glass is adequate for use with the prismatic element and spectral display system of this invention.

Fabrication of the monolithic prismatic element of the present invention may be accomplished with conventional techniques such as sawing, grinding, polishing and laminating (in the case of compound elements). As will be appreciated by those skilled in the art, sawing may be accomplished with a wet diamond saw, grinding may be accomplished with silicon carbide grinding mills, and polishing may be accomplished with cerium oxide/felt polishing lathes such as those utilized throughout the glass industry. If lamination is required, as with fabrication of compound elements, the common method of using ultraviolet (UV) curable optical cement, such as Loctite 349, is sufficient.

The fixed or monolithic prismatic element may be fabricated by several methods depending upon the quantity and the quality desired. By way of example, a variety of transparent solids may be machined into shape and either mirrored in several ways or laminated to existing mirror to form a solid prismatic element. For scientific purposes (small quantity, highest quality) optical glass machined to shape and mirrored with vapor deposited aluminum is preferred. For technical purposes (high quality, medium quantity) laminated, cut and machined common 0.25 inch plate glass mirror is preferred. For commercial purposes (large quantity, lower quality) injection molded plastic (methacrylic for example) with vapor deposited aluminum or lamination to a 0.25 inch plate glass mirror is preferred. Essentially, an optically flat window made in any transparent solid such that the window surface is fixed at about a 30° angle to an optically flat mirrored surface is consistent with this general embodiment.

By way of example, the general process for fabricating solid prismatic element 10 includes the following steps. First, the roughed-out element is formed by cutting a piece of plate glass mirror into strips of about 0.5 to 2.0 inches (1.27 to 5.08 cm) in width and up to a length of about eight (8) feet (2.44 meters). A scoring tool or similar device may be used to cut the plate glass in this fashion. After this step, the piece of cut plate glass is rectangular in cross-section. Second, the strip of glass is changed in cross-section from a rectangle to a 30-60-90° triangle first by sawing, then by grinding the plate glass until the desired geometry is achieved (see FIGS. 1a and 1b). Note that the silvering that comprises the mirrored surface is not subjected to sawing and grinding, but rather it is the un-silvered portion of the strip that is sawed and ground. Third, the newly ground, angled surface is polished until a clear glass window 16 has been created. Fourth, the edges and corners of element 10 are ground to eliminate any sharp edges that might make the element dangerous to handle.

2. Compound Element

Figure 2A:
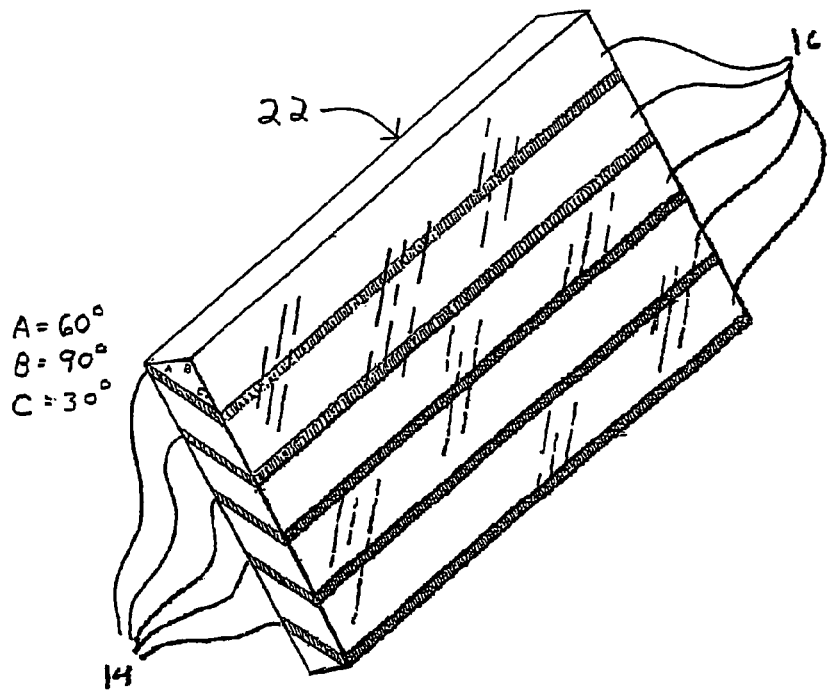
FIG. 2a is a perspective view of the assembled compound prismatic element.
Figure 2B:
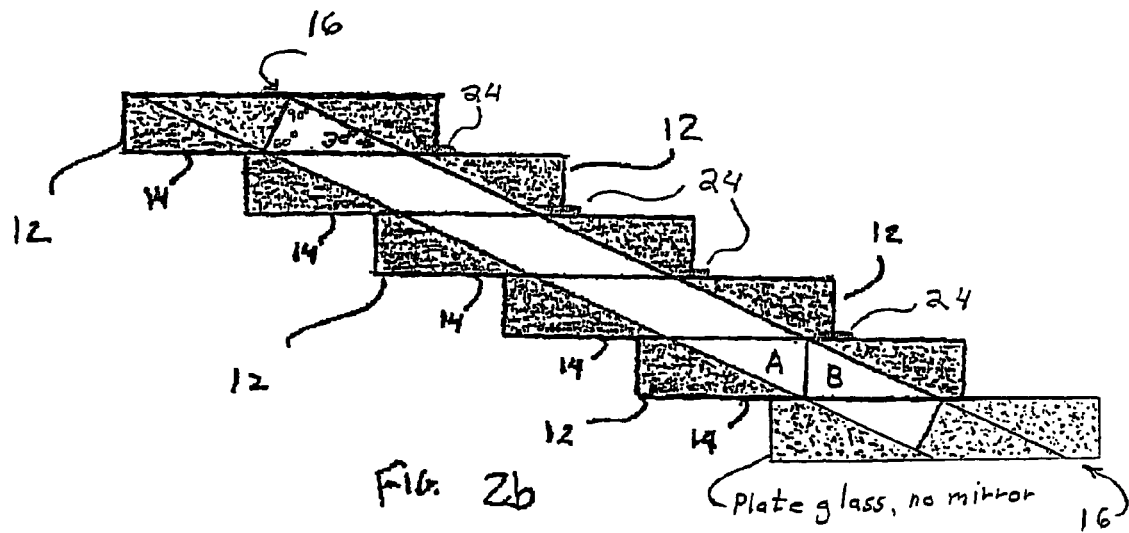

The solid prismatic elements of the present invention may be fabricated as a multiple-element or compound element in the Figures. FIG. 2a provides a perspective view of the assembled compound prismatic element 22 having multiple reflective surfaces 14 and multiple windows 16. FIG. 2b provides a side view of a plurality of strips of plate glass mirror laminated to one another in an offset manner for the purpose of fabricating compound prismatic element 22.

As best shown in FIG. 2b, strips of plate glass mirror 12 having reflective surfaces 14 and widths of about 0.25 inch (0.64 cm) are laminated to one another in an offset manner to form an assembly. Using the methods and devices described above, the assembly of plate glass mirror strips is ground to form a series of triangles having the preferred geometry of approximately 30-60-90°. As shown in FIG. 2b, the upper surface exposed by sawing and grinding the assembly is polished to form clear window 16. The other surfaces generated by this method are left in the ground state. The glass represented by triangle A is purely structural in that connects the individual optical elements. The glass represented by triangle B is the optical element, reflective surface 14 on bottom, window 16 on top. In this embodiment, the plate glass added to the bottom of the assembly protects the bottom mirror and gives the device a consistent rectangular shape. A plurality of thin glass shims 24 may be utilized to add structural support to the assembly.

The compound element creates a multiplicity of spectral displays in the same way as the single prismatic element previously described; however, the compound element emits multiple beams at a relatively small angle to the next element. Advantageously, the compound element provides several emergent beams that are generated from a relatively lightweight, compact element. The method of laminating multiple plate glass mirrors together in the fashion disclosed herein eliminates the need for many pieces of glass to accomplish the same task. If it is desirable to alter the angle and/or orientation of the single or compound prismatic elements, a commercially available coarse thread nut having a diameter of about 0.25 inches (0.64 cm) may be attached by adhesive means to the back of the mirrored surface to provide a point of attachment for a base such as a camera tripod.

B. Adjustable Prismatic Element

Figure 3:
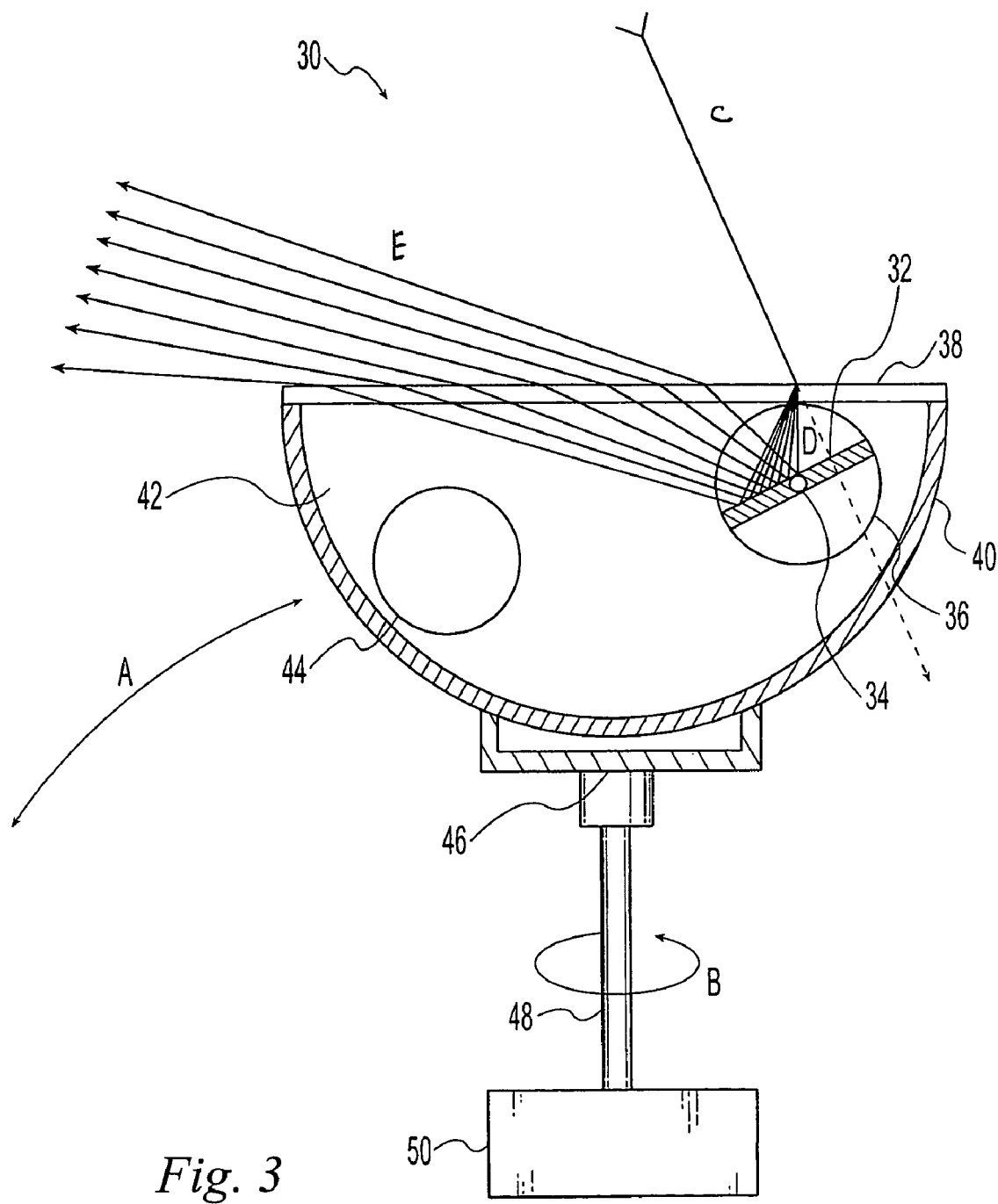
FIG. 3 is a cross-sectional side view of one embodiment of the present invention wherein the light dispersing assembly includes an adjustable mirror.
Figure 4:
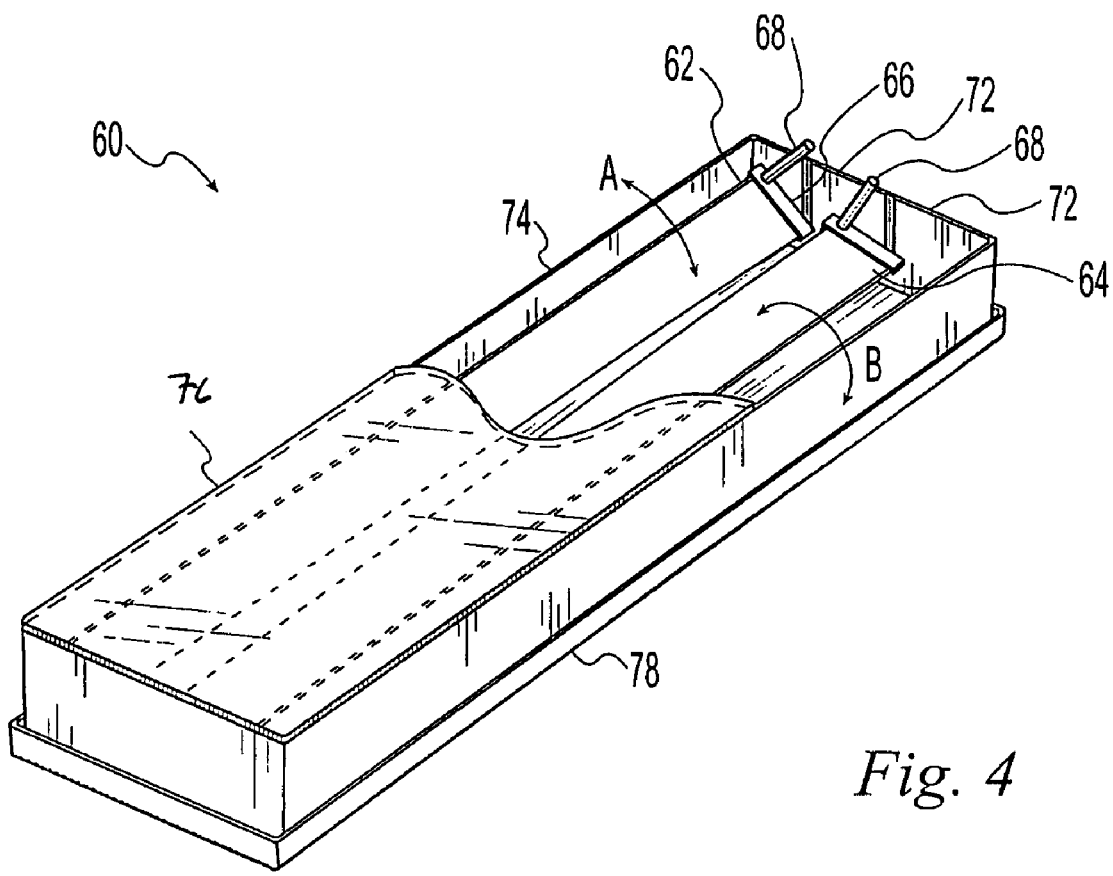
FIG. 4 is a perspective view of another embodiment of the present invention wherein the light dispersing assembly includes multiple adjustable mirrors.

The second general embodiment of the present invention includes prismatic element that utilizes a standard mirror, mirrors, or other materials with a highly reflective surfaces and water or a similar fluid that diffuses light in a predictable manner. Essentially, this embodiment of the present invention provides an adjustable dispersing mirror that is adapted to disperse a collimated beam of light, much as a common prism does, and direct that dispersed light beam at a target surface. FIG. 3 provides a cross-sectional side view of one embodiment of the present invention wherein the light dispersing assembly includes an adjustable mirror while FIG. 4 provides a perspective view of another embodiment of the present invention wherein the light dispersing assembly includes multiple adjustable mirrors. The dispersing mirror of the present invention provides a low-cost, low-weight, and relatively small alternative to currently available devices that produce pure, directable, spectral light.

The exemplary embodiment shown in FIG. 3 provides a mounted, adjustable, light dispersing device 30 that includes an adjustable reflective surface 32, a reservoir 40 for containing fluid media 42, and a means for supporting the system. In the exemplary embodiment, reservoir 40 is an elongated container closed on two ends, open on the top, and having a rounded bottom such that the reservoir resembles a cylinder that has been bisected lengthwise. Optional window 38, which is affixed to the open top of reservoir 40, allows light to enter the container, while at the same time sealing the container to prevent leakage of the fluid media. Prior to operating light dispersion device 30, the user must fill reservoir 40 with water or a similar transparent fluid that is capable of separating white light into its component wavelengths. Filling the reservoir is accomplished by turning the container on end, opening port 44 and filling the reservoir. Port 44 is closed and sealed by means of a cap, plug, or similar device.

Reflective surface 32 comprises an elongated, rectangular piece of mirror that has been mounted inside reservoir 40 by means of two mounting pins 34 attached to either end of reflective surface 32. Reflective surface 32 is oriented parallel to the longitudinal axis of reservoir 40. At one of the closed ends of reservoir 40, one of the mounting pins 34 extends through the material of the container and is attached to handle 36, which is mounted on the exterior of the container. The position of reflective surface 32 relative to a light source (see arrow C) and/or target can be changed or adjusted simply by turning handle 36. Advantageously, this embodiment of the present invention provides a flexible compromise between dispersion and reflection losses by allowing for a change of angle between the optically active surfaces of the device (see arrow D). Brightness and dispersion are controlled through independent and simultaneous change of the angle of incidence and emergence. The emergent spectral beam (see arrow E) from the exemplary embodiment is easily directable in the same way that a commonly used mirror directs a beam of light via rotation, i.e. by means of folded optics.

The component parts of light dispersing device 30 may be manufactured using techniques widely known in the art, including, but not limited to, injection molding, glass cutting, and plumbing. Preferably, the materials used in the construction of the device will not corrode and will not be compromised by extended periods of submersion in water. Preferably, any fluid that is added to reservoir 40 will be sterile and/or will be treated with a bactericide or other preservative or antifreeze. In particular, if reflective surface 32 is a common mirror, it may be necessary to treat the back of the reflective surface with a sealant or similar material that will provide extra corrosion resistance to the back of the device where the silvering is attached to the glass.

Again with reference to FIG. 3, the exemplary embodiment of adjustable light dispersing device 30 includes a support member 46 attached to the bottom of reservoir 40. This support member receives stand 48, which includes base 50, and which is attached to support member 46 by means of one or more mounting screws (not shown). Preferably, stand 48 is a telescoping device, is capable of raising the light dispersion device to a variable height, and may be used to place light dispersion device 30 on any number of substrates or surfaces. Base 50 provides the support and balance necessary to stabilize device 30. In the exemplary embodiment, stand 48 may be used to tilt device 30 forward or backward (see arrow A), and may be used to swivel device 30 around a central axis (see arrow B). A common camera tripod is one example of a device that is capable of performing the functions of stand 48.

A second exemplary embodiment of the fluid-filled, adjustable light dispersing device is shown in FIG. 4. This embodiment provides a table-top or desktop to version of the light dispersion device that may be quite small in size, e.g., about 2"×6", or may be very large in size, e.g., about 2'×8'. Light dispersion device with multiple mirrors 60 includes a first adjustable mirror 62 and a second adjustable mirror 64 that are positioned in slots 72 and 74 on the interior of basin 74. Each mirror is mounted within a bracket 66 at either end of the mirror, and on each of these mirrors, one of the brackets includes a handle 68 for changing the angle of the mirror. First adjustable mirror tilts in an upward or downward fashion in first slot 70 (see arrow A). Second adjustable mirror 64 tilts in an upward or downward fashion in second slot 72 independently of first adjustable mirror 64. As also shown in FIG. 4, basin 74 includes a base 78 for stabilizing the light dispersing mirror as well as an optional window or cover 76 which may be used to seal the device to prevent leakage or evaporation of the fluid media.

Light dispersion device with multiple mirrors 60 may be fabricated from materials such as those used with light dispersing device 30. Light dispersion device with multiple mirrors 60 may be operated by placing the device in the sun near a target surface and adjusting the multiple mirrors until the desired spectral display is created on the target surface. It may be necessary to move the device closer to, or farther away from, the target surface in order to create a clearly defined spectral display.

C. Arrays of Prismatic Elements

Both the monolithic prismatic elements and adjustable light dispersing mirrors of the present invention may be assembled in a frame to create an array of reflective devices. As shown in FIGS. 5, 6, and 7a-c, prismatic array 80 includes and assembly of elements 82 mounted inside frame 84 and placed within basin 90 which may or may not be covered with cover 88, and which may or may not contain water or a similar fluid. An array that includes a plurality of individual elements 86 that are non-adjustable, i.e., fixed or monolithic prismatic elements, would not typically require a fluid media to create the desired spectral displays. An array that includes a plurality of reflective surfaces, such as adjustable light dispersing mirrors would typically require such a fluid media.

In an exemplary embodiment, the semi-arced array configuration of the prismatic elements of this invention compensates for a moving light source such as the daily motion of the sun in order to provide a relative constant "rainbow effect" on a target surface such as a wall found inside a building or structure 100. The array permits some or all of the available mid-day sun to be refracted and then reflected through a window in order to provide colorful and dynamic illumination.

Figure 5:
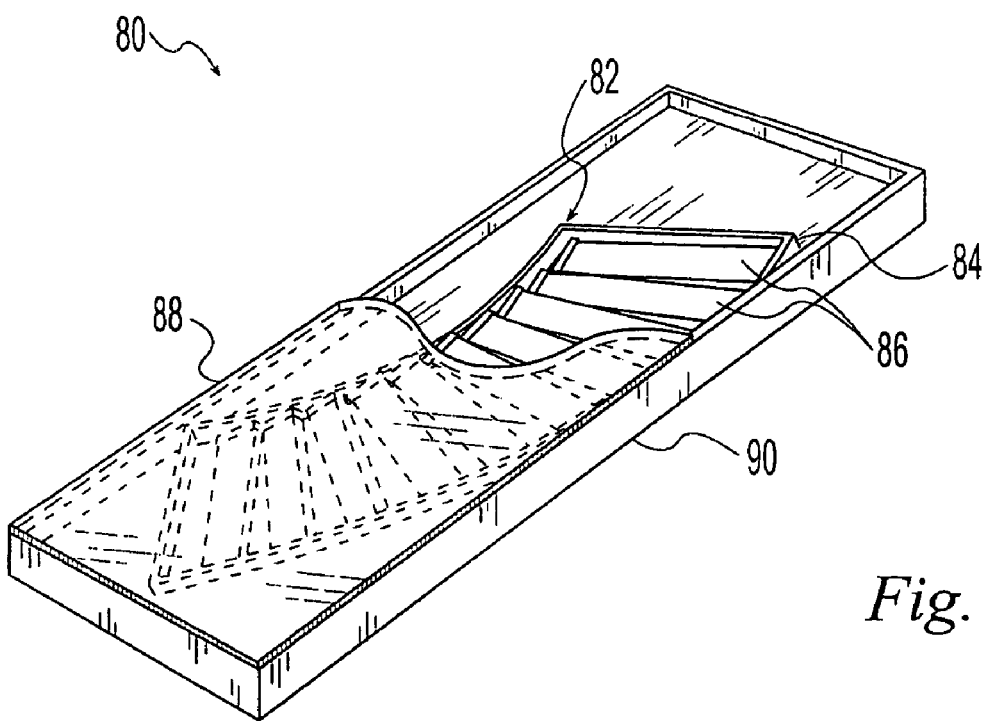
FIG. 5 is a perspective view of the present invention wherein the light dispersing assembly includes an array of solid light dispersing mirrors or solid prismatic elements.
Figure 6:
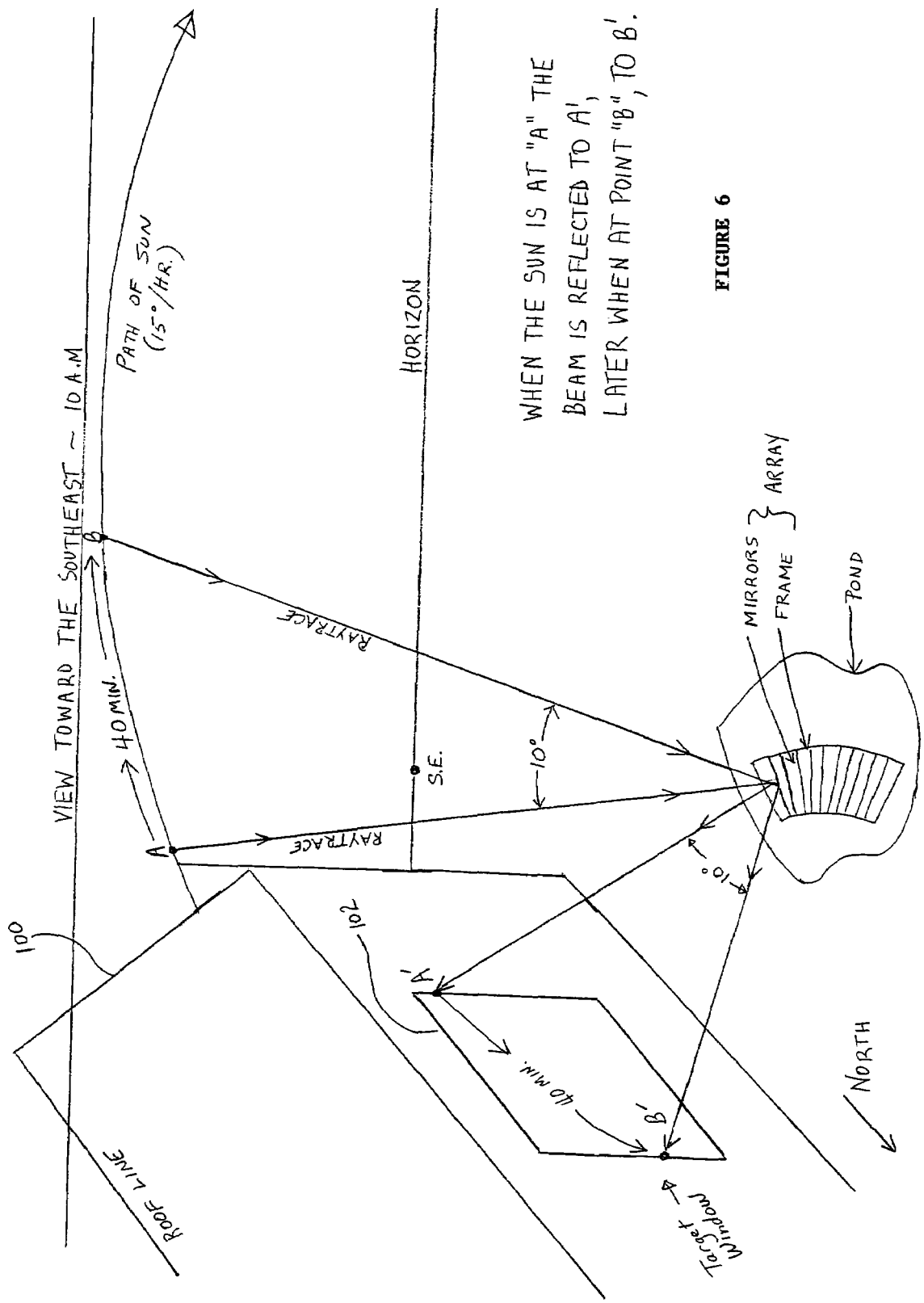
FIG. 6 is a perspective view of the array of FIG. 5 placed outside of a building, and wherein the array is positioned relative to the movement of the sun such that a spectral display is produced on a target surface.
Figure 7A:
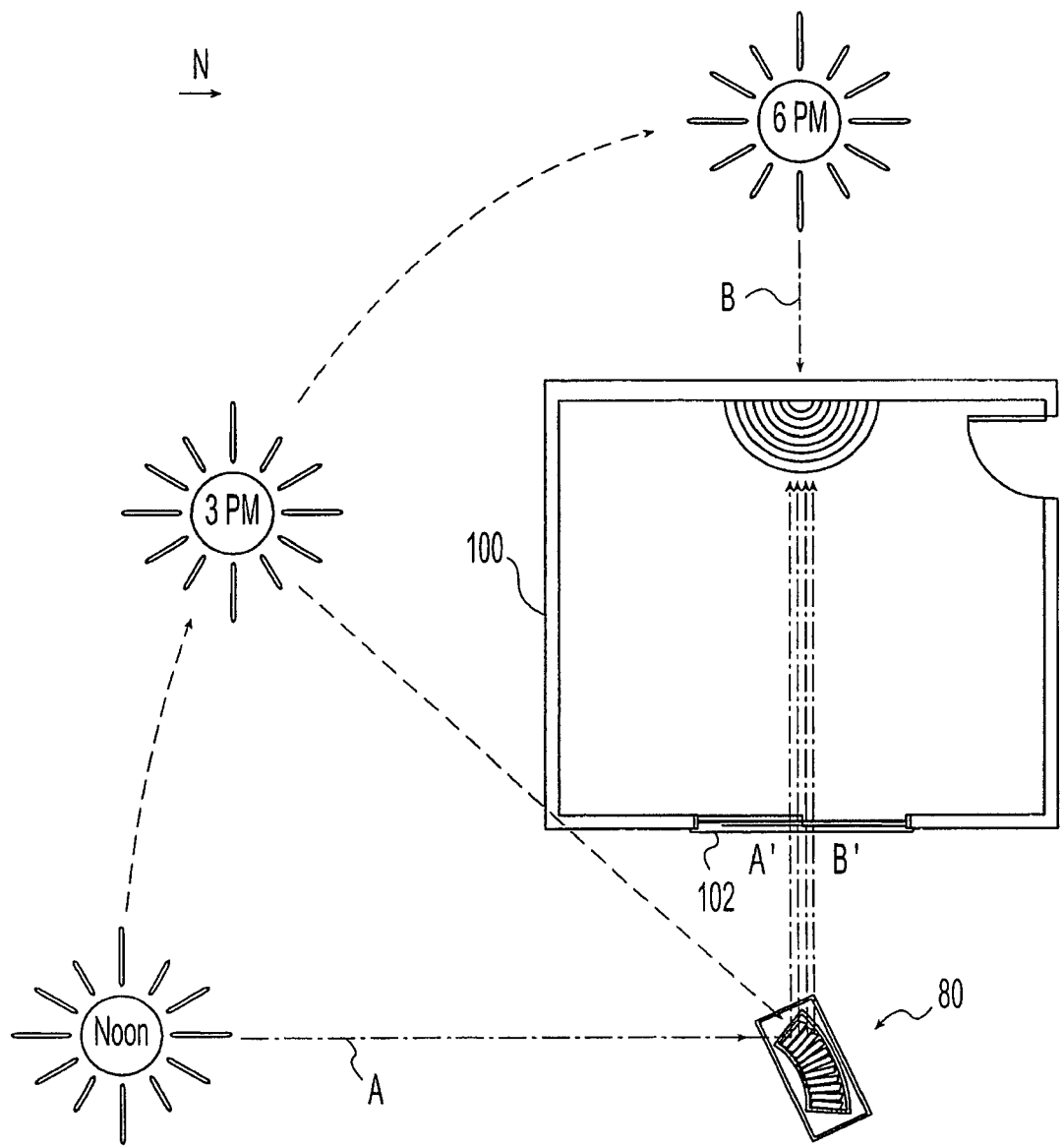
FIG. 7a is a top view of the array of FIG. 5 placed outside of a building in a first orientation, and wherein the array is positioned relative to the movement of the sun such that a spectral display is produced on the target.
Figure 7B:
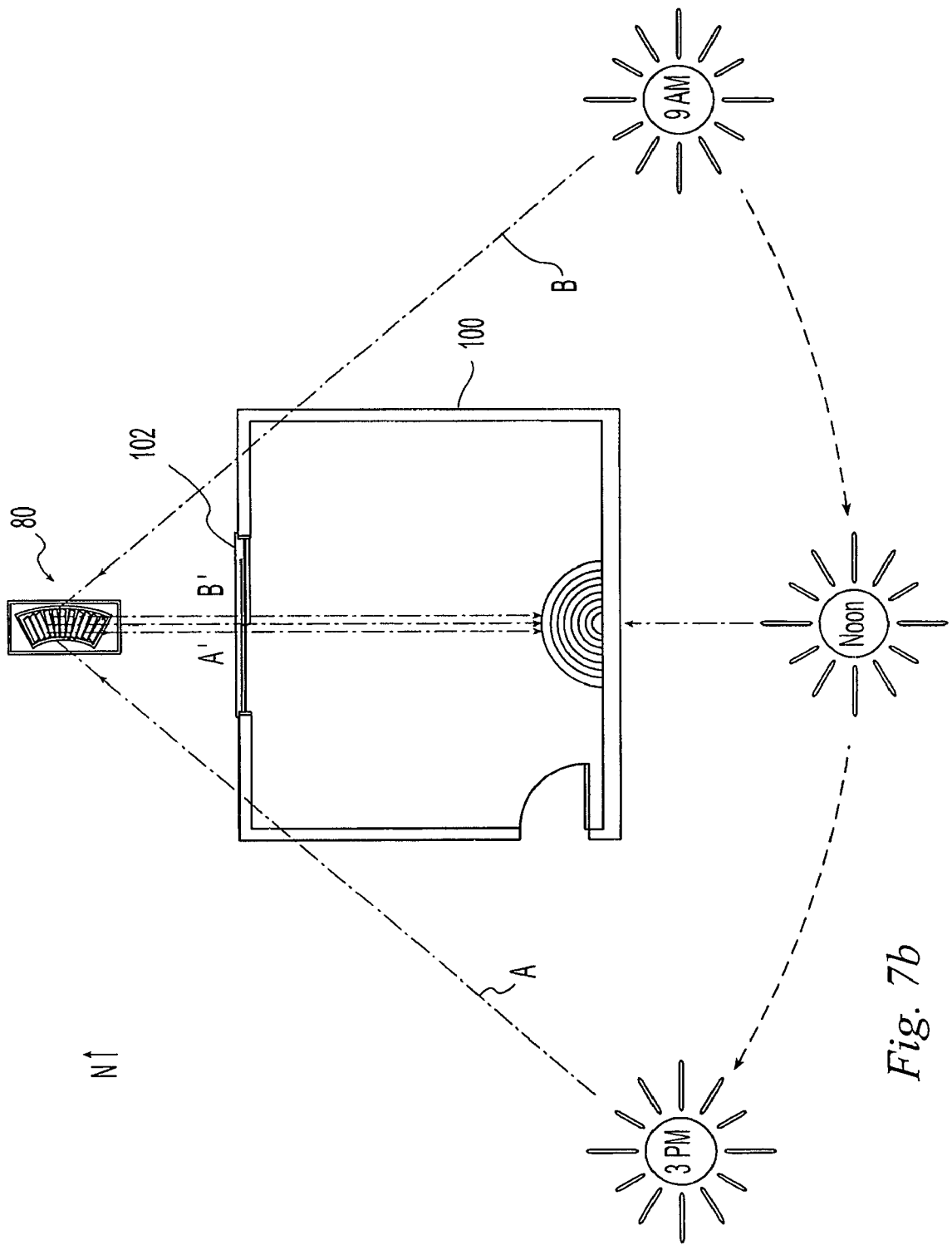
FIG. 7b is a top view of the array of FIG. 5 placed outside of a building in a second orientation, and wherein the array is positioned relative to the movement of the sun such that a spectral display is produced on the target.
Figure 7C:
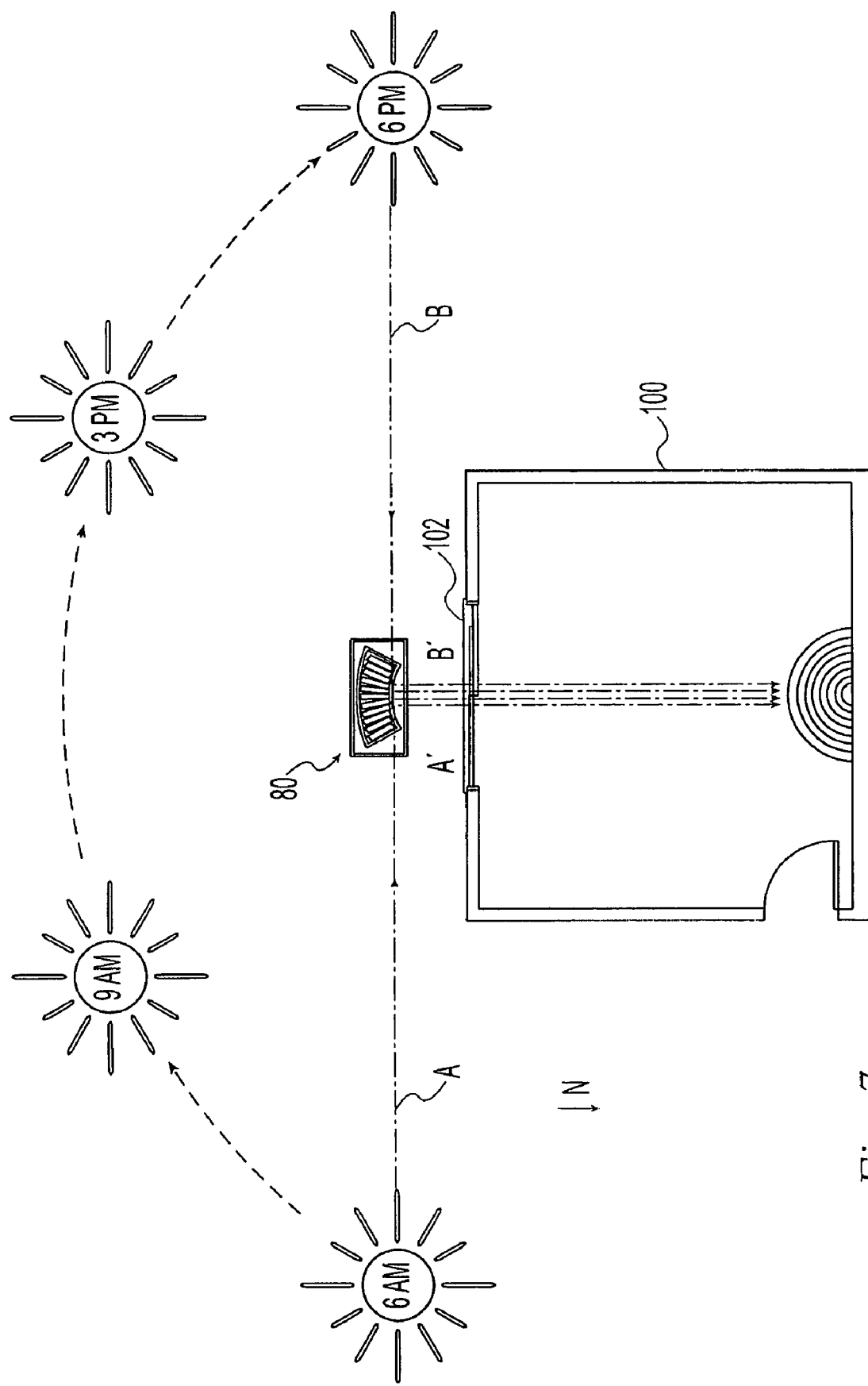
FIG. 7c is a top view of the array of FIG. 5 placed outside of a building in a third orientation, and wherein the array is positioned relative to the movement of the sun such that a spectral display is produced on the target.

FIG. 6 provides a perspective view of the array of FIG. 5 placed outside of a building, wherein the array is positioned relative to the movement of the sun such that a spectral display is produced on a target surface through a window 102. FIG. 7a provides a top view of the array of FIG. 5 placed outside of a building in a first orientation, and wherein the array is positioned relative to the movement of the sun such that a spectral display is produced on the target surface. FIG. 7b provides a top view of the array of FIG. 5 placed outside of a building in a second orientation, and wherein the array is positioned relative to the movement of the sun such that a spectral display is produced on the target surface. FIG. 7c provides a top view of the array of FIG. 5 placed outside of a building in a third orientation, and wherein the array is positioned relative to the movement of the sun such that a spectral display is produced on the target surface. In these Figures, when the sun is at position A, the light is reflected to position A' and when the sun is at position B, the light is reflected to position B'.

The solid glass and the sealed mirror-and-water dispersion mirrors may be similarly arrayed, but the open mirror-and-water version delivers the largest-scale effects most economically and constitutes a "refraction pond." An example of the "refraction pond" (FIGS. 6, 7a-c) consists of a 50° wide, horizontal fan shaped array of 10, 2" high×1" wide mirrors, supported in a frame at a 5° angle to each other all set in a shallow (1.25" (inches) or deeper) 'pond'. If the target window is on the west side of a building the 'pond' would be located about 15' outside and slightly north of the window so the morning sun (~10 AM) shines over the building onto the pond. The array in the pond is turned until the end mirror can reflect the sun at the right edge of the window. This mirror is then pivoted up or down to put the beam at the upper end of the window (Point A'). As the sun in the S.E. sky moves up and to the right, the reflected (and reflected) prismatic beam moves to the left and downward at the same angular rate (15°/hr.) as the sun. If it is assumed the target window is 10° wide from the position of the pond then the beam will move from the upper right of the window toward the lower left in 40 minutes. After only 20 minutes (5°) the second mirror of the array is ready to be pivoted to put the second beam at Point A' like the first. As the sun moves farther west each mirror is, in turn, pivoted to put the emergent beam at the height that will allow it to transit the window as the sun moves.

Because the emergent beams are 5° apart and the window 10° wide, there will be two or three beams in the window at one time in this example. The duration of this light show is 10×5° (per mirror)+10° (window width)=60° divided by 15°/hr. =4 hours max., weather permitting. This brief description is one of three target window scenarios (see FIGS. 7a-c); the one described herein works for both east and west windows. North facing windows are typically easier to target but south windows are more difficult however, all are treated similarly. Arrays of dispersing mirrors of any kind may be used for other provisions than solar motion compensation, such as multiple beam displays and illumination of multiple targets.

Figure 8:
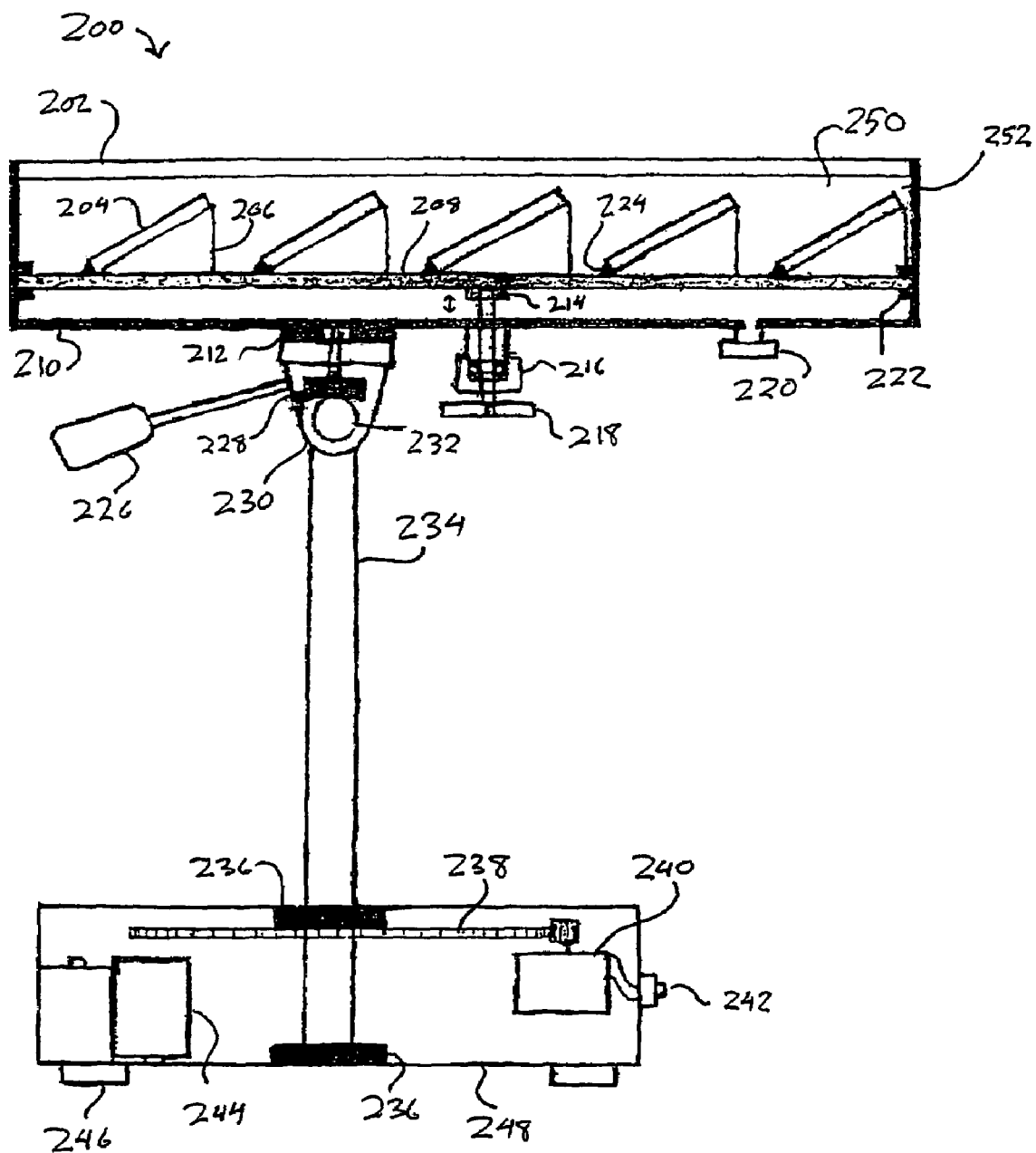
FIG. 8 is a cross-sectional side view of another embodiment of the present invention wherein the light dispersing assembly includes multiple adjustable mirrors.

FIG. 8 is a cross-sectional side view of yet another embodiment of the present invention that includes an array of prismatic elements. This embodiment provides a light dispersion device 200 that may be used indoors or outside in all seasons, with sunlight or appropriate, i.e., sufficient, artificial light as the source of light for the spectral display. As shown in FIG. 8, an exemplary embodiment of light dispersion device 200 includes a plurality of mirrored surfaces 204 placed within a container 210. A cover 202 includes a piece of 0.25 inch plate glass window. Mirrored surfaces 204 comprise 0.25 plate glass mirror (≈1½"×12") seated atop a series of 30°-60°-90° plastic wedges 206. A silicone glue bead 224 stabilizes each reflective surface atop wedges 206. The internal portion 250 of container 210 is filled with clear fluid by way of fill port 220.

The display created by this embodiment consists of a series of rainbows arranged in more or less continuous arc. Unlike a natural rainbow whole color bands run the length of the arc, these bands cross the narrow (12" or so) width of the ~36° arc and consist of 10 or so closely juxtaposed individual rainbows, during normal use. This device allows the length of the arc to be adjustable, form a dashed arc of widely separated rainbows to overlapping and mixing rainbows, to a complete overlap forming a single brighter (10x) rainbow band.

This adjustment is made through turning a value handle 218 thereby pushing on and flexing the mounting surface 208 of the mirrors which includes a plastic "false bottom." This push or pull is generated by the screw threads of the valve stem 216 when turned in combination with the reinforced swivel 214 attached to the bottom of the mirror mounting surface. This surface is rectangular and supported at only the two edges that are parallel to the length of the mirror strips, at the support slots 222 for the "false bottom." These support slots 222 are deep enough to grip mirror mounting surface 208 even when its length is shortened due to being flexed. The other two edges of mounting surface 208 are unsupported and form one side each of two gaps between mounting surface 208 and container 210, which is typically a hermetically sealed plastic or metal box. These gaps allow the clear fluid 252, which may be clear ethylene glycol, to flow from one side of the mounting surface to the other when flexed. Preferably, fluid 252, which is one of the antifreeze glycols, is be clear (not green) and chemically compatible with parts in contract with it.

The second adjustable area in this embodiment is an adapted camera mount that includes a vertical adjustment knob 226 and a camera mount body 230. Camera mount screw 228 holds container 210 at reinforced mounting bracket 212, which is located near the geometric center of the container for maintaining balance. Camera mount azimuth lock screw 232 allows the operator to place the unit in the sun (or projector light) and direct the reflected prismatic beams at a target of choice and fix the unit in position. The adapted camera mount rests atop a support tube 234 which connects the container 210 to a base.

The third adjustable area of this device includes a base that is self-operating once the device is turned on using switch 242. In the exemplary embodiment shown in FIG. 8, this area includes an electric turntable 236 powered by batteries 244 and enclosed in housing 248, which further includes stabilizing feet 246. The speed of the turntable (e.g., one revolution per 48 hour period) is determined by gear motor 240 and the gear motor-to-drive gear 238 ratio. The action of this turntable base neutralizes the horizontal motion of the sun with respect to the reflected prismatic beams and their target, but not the vertical movement of the sun. The result is that the arc of rainbow beams moves down and up as the sun moves up and down, but they do not move to the east as the sun moves west. A sustained illumination of the target surface is thus attained.

While the above description contains much specificity, this should not be construed as a limitation on the scope of the invention, but rather as an exemplification of certain preferred or exemplary embodiments. Numerous other variations of the present invention are possible, and it is not intended herein to mention all of the possible equivalent forms or ramifications of this invention. Various changes may be made to the present invention without departing from the scope or spirit of the invention.

What is claimed:

1. A system for creating a colorful spectral display, comprising:
   (a) an array of prismatic elements, wherein each prismatic element in the array further comprises:
      (i) a substantially solid light-dispersing medium;
      (ii) a highly reflective surface attached to the light-dispersing medium, wherein the highly reflective surface is planar; and
      (iii) a window formed in the light-dispersing medium at a predetermined angle relative to the highly reflective surface, wherein the window is planar and further includes a clear, polished surface, and wherein the angle of the reflective surface relative to the window is fixed; and
   (b) at least one source of white light directed at the windows of the prismatic elements, wherein the white light enters the prismatic elements through the windows, wherein the light-dispersing medium in each prismatic element disperses the white light into a spectrum of visible colors, and wherein the highly reflective surfaces in the prismatic elements reflect at least a portion of the dispersed white light back out of the prismatic elements through the windows thereof for creating a colorful spectral display; and
   (c) wherein the prismatic elements in the array are arranged in a semi-arc relative to one another, and wherein the array can be selectively positioned relative to the at least one source of white light.

2. The system of claim 1, further comprising a supportive frame for containing the array of prismatic elements.

3. The system of claim 1, wherein the light-dispersing medium further comprises plastic, polymer, glass, or quartz.

4. The system of claim 1, further comprising a display surface for visually displaying the spectral display created by the dispersed light exiting the array of prismatic elements.

5. The system of claim 1, further comprising a adjustable base attached to the array of prismatic elements for selectively positioning the array relative to the source of white light.

6. The system of claim 1, wherein the highly reflective surface further comprises a mirror.

* * * * *